United States Patent
Hadi Myavagh et al.

(10) Patent No.: US 10,639,623 B2
(45) Date of Patent: May 5, 2020

(54) DEVELOPMENT OF A HIGH-EFFICIENCY ADSORBENT FROM E-WASTE AND ALUMINOSILICATE-BASED MATERIALS FOR THE REMOVAL OF TOXIC HEAVY METAL IONS FROM WASTEWATER

(71) Applicant: The Hong Kong University of Science and Technology, Kowloon (CN)

(72) Inventors: Pejman Hadi Myavagh, Kowloon (CN); Gordon McKay, Kowloon (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 244 days.

(21) Appl. No.: 14/771,810

(22) PCT Filed: Mar. 12, 2014

(86) PCT No.: PCT/CN2014/000253
§ 371 (c)(1),
(2) Date: Sep. 1, 2015

(87) PCT Pub. No.: WO2014/146481
PCT Pub. Date: Sep. 25, 2014

(65) Prior Publication Data
US 2016/0023202 A1    Jan. 28, 2016

Related U.S. Application Data

(60) Provisional application No. 61/852,474, filed on Mar. 18, 2013.

(51) Int. Cl.
*B01J 39/14*    (2006.01)
*C02F 1/42*    (2006.01)
(Continued)

(52) U.S. Cl.
CPC ............ *B01J 39/14* (2013.01); *B01J 39/09* (2017.01); *B01J 47/016* (2017.01); *C02F 1/42* (2013.01);
(Continued)

(58) Field of Classification Search
None
See application file for complete search history.

(56) References Cited

U.S. PATENT DOCUMENTS

| | | | |
|---|---|---|---|
| 4,389,491 A | 6/1983 | Hanamoto et al. | |
| 2009/0113838 A1* | 5/2009 | Paulsen | B32B 5/022 52/653.1 |
| 2013/0008855 A1 | 1/2013 | Vest et al. | |

FOREIGN PATENT DOCUMENTS

| | | |
|---|---|---|
| CN | 101073784 A | 11/2007 |
| WO | 01/70391 A1 | 9/2001 |
| WO | 2006/094746 A1 | 9/2006 |

OTHER PUBLICATIONS

Huang. 2008. Recycling of waste printed circuit boards. Journal of Hazardous Materials.*
(Continued)

*Primary Examiner* — Kara M Peo
(74) *Attorney, Agent, or Firm* — Osha Liang LLP

(57) ABSTRACT

An impregnated and activated ion exchange material prepared by a process is provided that includes: impregnating an ion exchange precursor material, wherein impregnation of the ion exchange precursor material includes reacting the ion exchange precursor material with an impregnator solution, thereby increasing the surface area and the hydrophilicity of the ion exchange precursor material; activating the impregnated ion exchange precursor material to increase the porosity of the impregnated ion exchange precursor material, wherein the ion exchange precursor material comprises at least one of nonmetallic printed (NMP) circuit board,
(Continued)

amorphous aluminosilicate, or mixtures thereof. In other aspects, a method for fabricating an ion exchanger and a method for removing heavy metal ions from a solution are provided.

14 Claims, 5 Drawing Sheets

(51) Int. Cl.
*B01J 39/09* (2017.01)
*B01J 47/016* (2017.01)
*C02F 101/20* (2006.01)
*C02F 103/18* (2006.01)
*C02F 103/00* (2006.01)

(52) U.S. Cl.
CPC .... *C02F 2001/425* (2013.01); *C02F 2101/20* (2013.01); *C02F 2103/001* (2013.01); *C02F 2103/18* (2013.01)

(56) References Cited

OTHER PUBLICATIONS

Kurniawan. 2006. Comparisons of lowcost adsorbents for treating wastewaters laden with heavy metals. Science of Total Environment.*

International Search Report issued in corresponding application No. PCT/CN2014/000253 dated Jun. 13, 2014 (2 pages).

* cited by examiner

| Sample ID | Composition (wt%) | | | | |
|---|---|---|---|---|---|
| | C | H | N | S | Others (by difference) |
| NMP | 21 | 0.1 | 0.6 | 0 | 78.3 |
| A-NMP | 1.6 | 0 | 0.1 | 0 | 98.3 |

| Element | Elemental Composition of NMP (mol%) | Elemental Composition of A-NMP (mol%) |
| --- | --- | --- |
| Al | 11.4 | 10.3 |
| Si | 50.6 | 43.4 |
| Ca | 29.7 | 26.6 |
| Ti | 0.6 | 0.6 |
| Fe | 0.2 | 0.3 |
| Cu | 1.8 | 1.4 |
| Br | 4.1 | 0 |
| Ba | 0.6 | 0.5 |
| K | 0 | 16.9 |

DEVELOPMENT OF A HIGH-EFFICIENCY ADSORBENT FROM E-WASTE AND ALUMINOSILICATE-BASED MATERIALS FOR THE REMOVAL OF TOXIC HEAVY METAL IONS FROM WASTEWATER

CROSS-REFERENCE TO RELATED APPLICATIONS

Pursuant to 35 U.S.C. § 119(e), this application claims benefit of U.S. Provisional Application No. 61/852,474 filed on Mar. 18, 2013, entitled "DEVELOPMENT OF NOVEL MATERIAL FROM E-WASTE FOR THE REMOVAL OF TOXIC HEAVY METAL IONS FROM WASTEWATER." The disclosure of the U.S. Provisional application is incorporated herein by reference in its entirety.

BACKGROUND

Printed Circuit Boards (PCBs) are platforms on which integrated circuits and other electronic devices and connections are installed. In general, waste PCBs contain approximately 30% metals and 70% nonmetals. The nonmetal PCB can be further categorized in two groups that are organic and ceramics. Organic materials in PCB are mainly composed of plastics which are predominantly C—H—O and halogenated polymers. Ceramics present in the PCB are primarily silica, alumina and calcium silicate. Notably, significant quantities of nonmetals in PCBs present an especially difficult challenge for recycling because they consist mainly of resins and glass fibers which cannot be re-melted or reformed because of their network structure. The nonmetal PCB is also referred to as nonmetallic part (NMP) of scrap printed circuit boards or just "NMP." NMP is a very hydrophobic material.

On the other hand, although certain heavy metals in trace amounts are beneficial to human health, in large quantities they may cause harm. However, because of their emission and disposal into the environment, heavy metals may accumulate in terrestrial and aquatic environments in high concentrations. Further, rain and snow can wash out the heavy metal contaminants from the air and soil, entering the surface and underground waters and pollute them. Therefore, the earth's waters may contain various toxic metals which could result in drinking water contamination and bioaccumulation. Bioaccumulation is an increase in the concentration of a chemical in a biological organism over time, compared to the chemical's concentration in the environment. Compounds accumulate in living things any time they are taken up and stored faster than they are excreted or metabolized.

Therefore, it would be advantageous if there was a material, method of making such material, and a method of using such material to remove heavy metal ions from solutions. It would be further advantageous if such a material could be made from waste or scrap material.

SUMMARY OF CLAIMED EMBODIMENTS

In general, in one aspect, one or more embodiments disclosed herein relate to a method for fabricating an ion exchanger. The method may include: impregnating an ion exchange precursor material, wherein impregnating the ion exchange precursor material may include: reacting the ion exchange precursor material with an impregnator solution, thereby increasing the surface area and the hydrophilicity of the ion exchange precursor material; activating the impregnated ion exchange precursor material to increase the porosity of the impregnated ion exchange precursor material.

In one or more embodiments, the method for fabricating an ion exchanger may further include washing and drying the impregnated and activated ion exchange precursor material.

In one or more embodiments, the method for fabricating an ion exchanger may include impregnating of the ion exchange precursor material, wherein during the impregnating of the ion exchange precursor material, a portion of the bonds in the ion exchange precursor material is broken up into hydroxyl moieties.

In one or more embodiments, the method for fabricating an ion exchanger may include impregnating of the ion exchange precursor material, wherein during the impregnating of the ion exchange precursor material, a first plurality of alkali metal ions present in the impregnator solution is exchanged with hydrogen atoms at the surface of the ion exchange precursor material.

In one or more embodiments, the method for fabricating an ion exchanger may include impregnating of the ion exchange precursor material, wherein during the impregnating of the ion exchange precursor material, the ion exchange precursor material is converted from a hydrophobic to a hydrophilic material.

In one or more embodiments, the method for fabricating an ion exchanger may include activating of the impregnated ion exchange precursor material, wherein during the activating of the impregnated ion exchange precursor material, a residual carbon content of the impregnated ion exchange precursor material is reduced.

In one or more embodiments, the method for fabricating an ion exchanger may include activating of the impregnated ion exchange precursor material, wherein during the activating of the impregnated ion exchange precursor material, a plurality of bond cleavages is restored in the impregnated ion exchange precursor material.

In one or more embodiments, the method for fabricating an ion exchanger may include activating of the impregnated ion exchange precursor material, wherein during the activating of the impregnated ion exchange precursor material, a plurality of hydroxyl groups is introduced into the impregnated ion exchange precursor material.

In one or more embodiments, the method for fabricating an ion exchanger may include activating of the impregnated ion exchange precursor material, wherein during the activating of the impregnated ion exchange precursor material, a second plurality of alkali metal ions is exchanged for hydrogen atoms in the impregnated ion exchange precursor material.

In one or more embodiments, the method for fabricating an ion exchanger may include activating of the impregnated ion exchange precursor material, wherein during the activating of the impregnated ion exchange precursor material, the surface and the inner layers of the impregnated ion exchange precursor material are activated.

In one or more embodiments, the method for fabricating an ion exchanger may include at least one of nonmetallic printed (NMP) circuit board, amorphous aluminosilicate, or mixtures thereof, as the ion exchange precursor material.

In one or more embodiments, the method for fabricating an ion exchanger may include an impregnator solution, such as at least one of water, caustic solution, or mixtures thereof. In one or more embodiments, the molarity of the caustic solution is between 0.05 and 5 mol/L.

In one or more embodiments, the method for fabricating an ion exchanger may include impregnating of the ion exchange precursor material, wherein during the impregnating of the ion exchange precursor material, the mass ratio of impregnator solution to ion exchange precursor material is between 0.05 and 10.

In one or more embodiments, the method for fabricating an ion exchanger may include impregnating of the ion exchange precursor material, wherein during the impregnating of the ion exchange precursor material, the duration of impregnating the ion exchange precursor material is between 0.5 and 48 hours.

In one or more embodiments, the method for fabricating an ion exchanger may include impregnating of the ion exchange precursor material, wherein during the impregnating of the ion exchange precursor material, the impregnated ion exchange precursor material is at a temperature between 20 and 90° C.

In one or more embodiments, the method for fabricating an ion exchanger may include activating of the impregnated ion exchange precursor material, wherein during the activating of the impregnated ion exchange precursor material, the duration of activating the impregnated ion exchange precursor material is between 0.5 and 24 hours.

In one or more embodiments, the method for fabricating an ion exchanger may include activating of the impregnated ion exchange precursor material, wherein during the activating of the impregnated ion exchange precursor material, the impregnated ion exchange precursor material is heated to a temperature between 100 and 700° C.

In one or more embodiments, the method for fabricating an ion exchanger may include activating of the impregnated ion exchange precursor material, wherein during the activating of the impregnated ion exchange precursor material, the atmosphere surrounding the impregnated ion exchange precursor material may include at least one of air, nitrogen, or mixtures thereof.

In another aspect, one or more embodiments disclosed herein relate to a method for removing heavy metal ions from a solution. The method may include: bringing an impregnated and activated ion exchange precursor material in contact with the solution containing heavy metal ions; and exchanging heavy metal ions from the solution for alkali metal ions in the impregnated and activated ion exchange precursor material, wherein the heavy metal ions from the solution are adsorbed at the impregnated and activated ion exchange precursor material and the exchanged alkali metal ions are released into the solution.

In one or more embodiments, the method for removing heavy metal ions from a solution may include at least one of municipal waste water, commercial waste water, by-product of an industrial process, naturally contaminated water, accidentally contaminated water, and water contaminated by runoff, as the solution containing heavy metal ions.

In another aspect, one or more embodiments disclosed herein relate to an impregnated and activated ion exchange material prepared by a process. The process may include the steps of: impregnating an ion exchange precursor material, wherein impregnating the ion exchange precursor material may include: reacting the ion exchange precursor material with an impregnator solution, thereby increasing the surface area and the hydrophilicity of the ion exchange precursor material; activating the impregnated ion exchange precursor material to increase the porosity of the impregnated ion exchange precursor material, wherein the ion exchange precursor material comprises at least one of nonmetallic printed (NMP) circuit board, amorphous aluminosilicate, or mixtures thereof.

This summary is provided to introduce a selection of concepts that are further described below in the detailed description. This summary is not intended to identify key or essential features of the claimed subject matter, nor is it intended to be used as an aid in limiting the scope of the claimed subject matter.

DETAILED DESCRIPTION

Figure 1A:
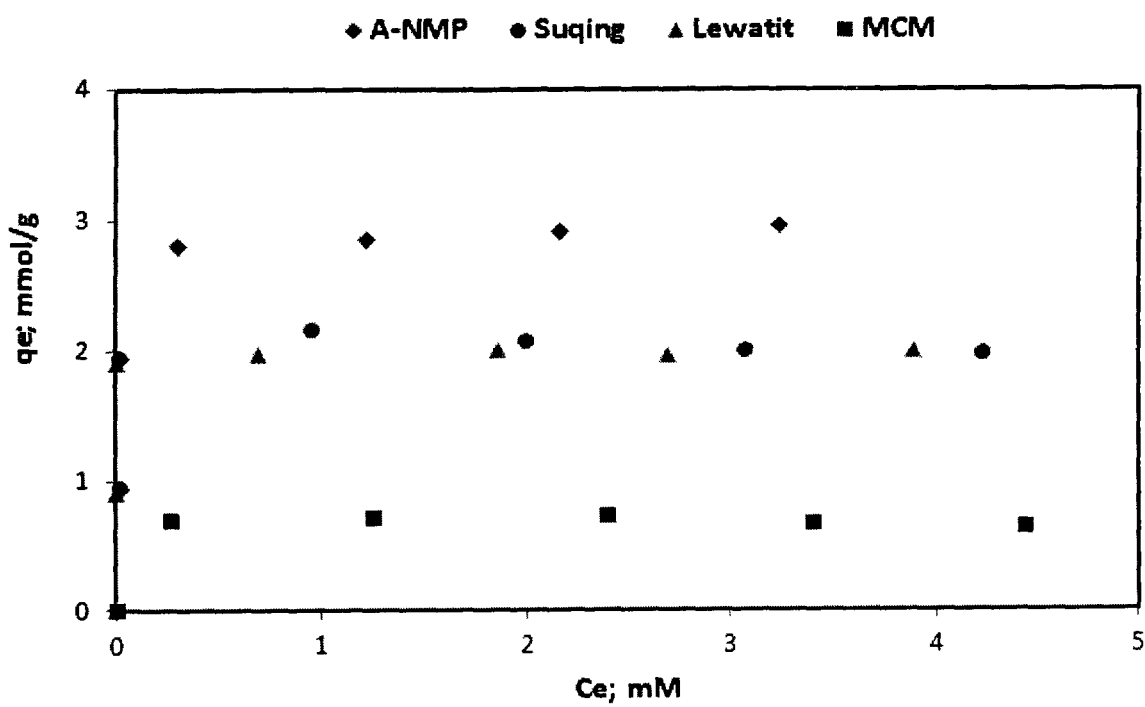
FIG. 1a shows removal efficiencies of materials in accordance with one or more embodiments disclosed herein.

Following is a detailed description of specific embodiments disclosed herein with reference to the Figures. In these Figures, several details are presented to further the understanding of the disclosed embodiments. However, these details may not be required or could be substituted for other details as would be known to one with ordinary skill in the art. In addition, other well-known features have not been described as not to distract from the description of the disclosed embodiments.

In one aspect, embodiments disclosed herein relate to a method for fabricating an ion exchanger. In another aspect, embodiments disclosed herein relate to an impregnated and activated ion exchange material prepared by a process. In yet another aspect, in one or more embodiments, a method is disclosed for removing heavy metal ions from a solution. In particular embodiments, the method for removing heavy metal ions from a solution described herein may be used to remove heavy metal ions from at least one of municipal waste water, commercial waste water, by-product of an industrial process, naturally contaminated water, accidentally contaminated water, and water contaminated by runoff.

A Method for Fabricating an Ion Exchanger

In one aspect, embodiments disclosed herein relate to a method for fabricating an ion exchanger. In one or more embodiments disclosed herein, the method may include impregnating an ion exchange precursor material and activating the impregnated ion exchange precursor material to increase the porosity of the impregnated ion exchange precursor material. In one or more embodiments disclosed herein, the ion exchange precursor material may include the nonmetallic part (NMP) of scrap printed circuit boards.

NMP is alternatively referred herein as nonmetallic printed circuit board, untreated NMP or simply "NMP." NMP is characterized as a very hydrophobic material. In other embodiments disclosed herein, the ion exchange precursor material may include amorphous aluminosilicate. In yet other embodiments disclosed herein, the ion exchange precursor material may include mixtures of NMP and amorphous aluminosilicate.

In one or more embodiments disclosed herein, the impregnation of the NMP may include reacting the NMP with an impregnator solution. In one or more embodiments disclosed herein, the impregnator solution may include at least one of water, caustic solution, or mixtures thereof. In other embodiments disclosed herein, the impregnator solution may include a caustic solution. Accordingly, during the reacting with the NMP, the caustic solution increases the surface area of the NMP and increases the NMP hydrophilicity. Depending on the duration of impregnating the NMP with caustic solution, the NMP is converted from a hydrophobic material to a hydrophilic material. Further, during impregnation of the NMP, a portion of the bonds in the NMP is broken up into hydroxyl moieties. In addition, during impregnation of the NMP, a first plurality of alkali metal ions present in the caustic solution is exchanged with hydrogen atoms at the surface of the NMP.

In one or more embodiments disclosed herein, the molarity of the caustic solution during the reacting with the NMP may range from a fraction of a mol/L to several mol/L, such as 0.05 to 5 mol/L in some embodiments, 0.05 to 1 mol/L in other embodiments, 1 to 2.5 mol/L in other embodiments, and 2.5 to 5.0 mol/L in yet other embodiments; however, other embodiments may utilize a molarity of the caustic solution lesser than or greater than 0.05 and 5 mol/L, respectively.

Further, the duration of impregnating the NMP in one or more embodiments disclosed herein, may range from a fraction of an hour to several tenths of hours, such as 0.5 to 48 hours in some embodiments, 0.5 to 5 hours in other embodiments, 1 to 20 hours in other embodiments, and 10 to 48 hours in yet other embodiments; however, other embodiments may utilize a duration of impregnating the NMP lesser than or greater than 0.5 and 48 hours, respectively.

In one or more embodiments disclosed herein, the temperature of the NMP during the impregnation may range from ambient temperature to several tenths degrees Celsius, such as 20 to 90° C. in some embodiments, 20 to 50° C. in other embodiments, 30 to 70° C. in other embodiments, and 50 to 90° C. in yet other embodiments; however, other embodiments may utilize a temperature of the NMP during the impregnation lesser than or greater than 20 to 90° C., respectively.

In addition, in one or more embodiments disclosed herein, the mass ratio of impregnator solution to NMP during the impregnation of NMP may range from a fraction of unity to multiples of unity, such as 0.05 to 10 in some embodiments, 0.05 to 1 in other embodiments, 1 to 5 in other embodiments, and 5 to 10 in yet other embodiments; however, other embodiments may utilize a mass ratio of impregnator solution to NMP lesser than or greater than 0.05 and 10, respectively.

In one or more embodiments disclosed herein, the activation of the impregnated NMP may include increasing the porosity of the impregnated NMP. For example, in some embodiments disclosed herein, the activation of the impregnated NMP may include heating the impregnated NMP. During the heating, a residual carbon content of the impregnated NMP is reduced. Further, during the activation, not only the surface, but also the inner layers of the impregnated NMP are activated. Specifically, during the activation of the impregnated NMP, a plurality of bond cleavages is restored in the impregnated NMP, a plurality of hydroxyl groups is introduced into the impregnated NMP, and a second plurality of alkali metal ions is exchanged for hydrogen atoms in the impregnated NMP.

Further, the duration of activating the impregnated NMP may range from a fraction of an hour to several tenths of hours, such as 0.5 to 24 hours in some embodiments, 0.5 to 2.5 hours in other embodiments, 1 to 10 hours in other embodiments, and 10 to 24 hours in yet other embodiments; however, other embodiments may utilize a duration of activating the impregnated NMP lesser than or greater than 0.5 and 24 hours, respectively.

In one or more embodiments disclosed herein, the activation of the impregnated NMP may be done by heating and the temperature range for heating the impregnated NMP is about several hundred degrees Celsius, such as 100 to 700° C. in some embodiments, 100 to 250° C. in other embodiments, 200 to 500° C. in other embodiments, and 400 to 700° C. in yet other embodiments; however, other embodiments may utilize a temperature for activation of the impregnated NMP lesser than or greater than 100 and 700° C., respectively.

During the activation of the impregnated NMP, in some embodiments disclosed herein, the atmosphere surrounding the impregnated NMP may include at least one of air, nitrogen, or mixtures thereof. Once the activation of the impregnated NMP is complete, the method for fabricating an ion exchanger may further include, in one or more embodiments disclosed herein, washing and drying the impregnated and activated NMP.

Although the method for fabricating an ion exchanger disclosed herein has been described by example using NMP as the ion exchange precursor material, it is understood that other embodiments disclosed herein may include amorphous aluminosilicate as the ion exchange precursor material. Yet further embodiments disclosed herein may include mixtures of NMP and amorphous aluminosilicate.

An Example for a Method for Fabricating an Ion Exchanger

In an exemplary embodiment of the invention, an ion exchanger is fabricated using NMP as the ion exchange precursor material. The NMP is reacted for 3 hour with 1M potassium hydroxide solution. During the reacting, the mass ratio of potassium hydroxide solution to NMP is 3:1. After the reacting time has elapsed, the impregnated NMP is activated by heating at a temperature of 250° C. for 3 hours. When the activation time has elapsed, the impregnated and activated NMP is washed and dried. However, it is understood by one of ordinary skill in the art that the above-referenced conditions and materials are exemplary only and therefore not limiting. Other conditions and materials could be used as well for fabricating an ion exchanger, without departing from the scope of this disclosure.

Figure 1B:
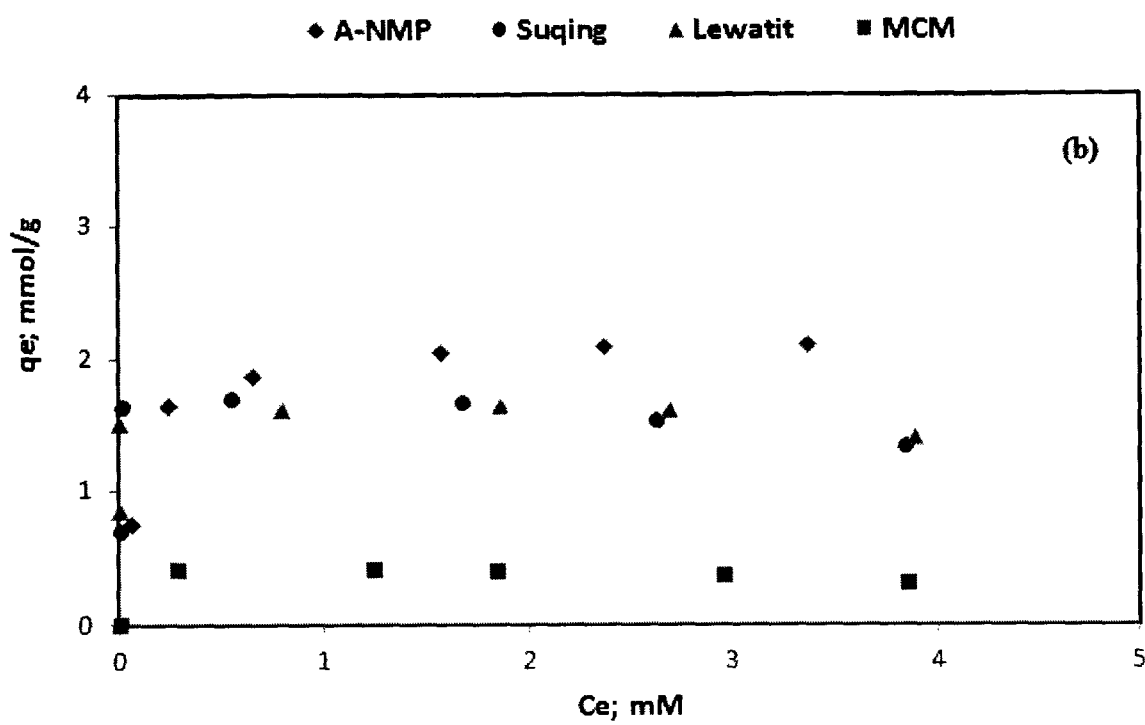
FIG. 1b shows removal efficiencies of materials in accordance with one or more embodiments disclosed herein.
Figures 1C, 2:
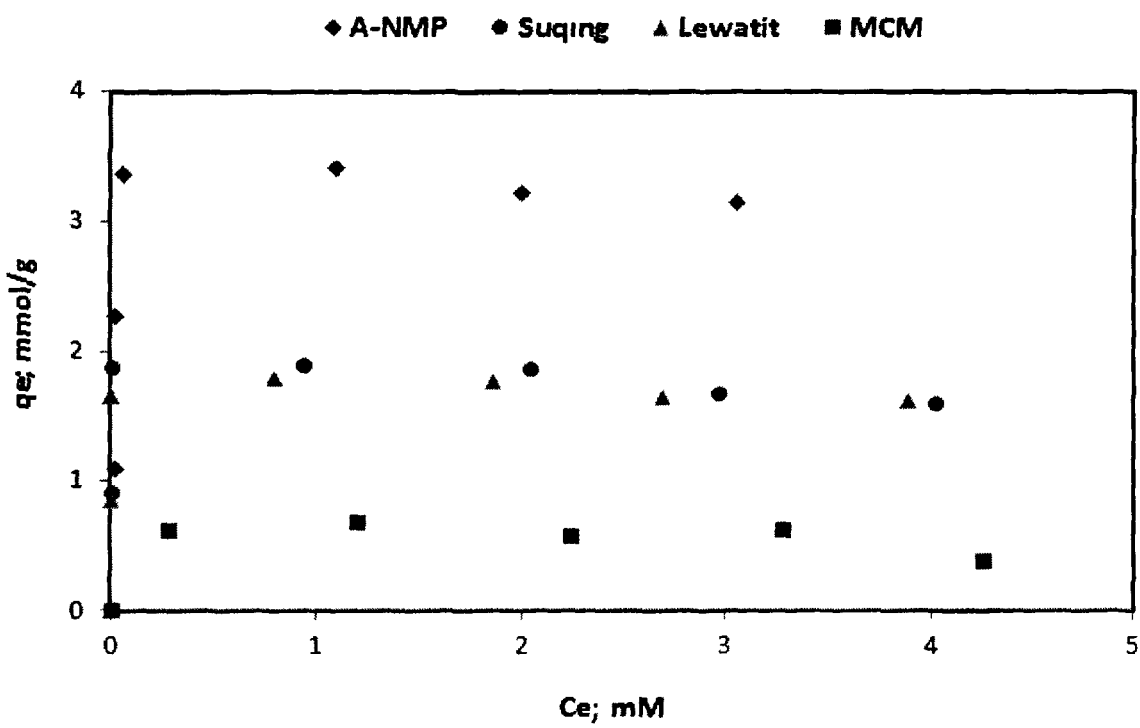
FIG. 1c shows removal efficiencies of materials in accordance with one or more embodiments disclosed herein.
FIG. 2 shows elemental compositions of materials in accordance with one or more embodiments disclosed herein.

FIGS. 1a, 1b, and 1c illustrate the heavy metal removal efficiencies of an ion exchanger fabricated in accordance with the method as described above. The heavy metal removal efficiencies of the ion exchanger is tested by putting 5 g of the impregnated and activated NMP into 50 ml of an aqueous solution containing, for example, 10-500 ppm Cu at a pH of 5. Similar, separate aqueous solutions are prepared with 10-500 ppm of Zn and Pb, respectively. Subsequently, the concentrations of the heavy metals are measured over time and eventually the heavy metal concentration reaches an equilibrium. The difference between the initial and the final metal concentration is considered as amount of heavy metal adsorbed by the ion exchanger. By plotting this difference (qe) versus the equilibrium concentration (Ce), there is a trend in which by increasing the Ce, the amount of adsorbed metal will increase until it reaches a plateau which is indicative of the adsorption capacity of the fabricated material. In this context, removal efficiency and adsorption capacity are synonymously used.

Accordingly, FIGS. 1a, 1b, and 1c illustrate the ion exchanger adsorption capacity for Cu, Zn, and Pb, respectively. For example, FIG. 1a indicates that the adsorption capacity for Cu is 3 mmol Cu per g adsorbent (A-NMP). This value is higher than the adsorption capacities of three commercially available adsorbents under the trademarks, Suqing D401® (Jiangsu Suqing Water Treatment Engineering Group Co., Ltd, Hetang, Jiangyin, Jinagsu, China), Lewatit TP207® (Lanxess AG, Cologne, Germany), and MCM® (Exxon Mobil Corporation, Irving, Tex., United States). Further, when amorphous aluminosilicate is used as the ion exchange precursor material, the adsorption capacity of the impregnated and activated amorphous aluminosilicate is similar to the adsorption capacity of A-NMP, due to the similarity of the compositions of these two materials.

Characterization of Untreated NMP and Impregnated and Activated NMP (A-NMP)

The major components of NMP are aluminosilicate and carbon. After the activation of the impregnated NMP, the aluminosilicate portion remains unchanged, but the carbon content is much reduced. The elemental compositions of the untreated NMP and activated NMP (A-NMP) are shown in FIGS. 2 and 3.

In order to determine the structure of NMP and A-NMP, analytical characterization of the materials by Fourier transform infrared spectroscopy (FTIR) is used to monitor the changes in the course of modification. FIG. 4 illustrates the IR spectrum of NMP and A-NMP in a range of wavelengths which best characterizes the material. The characteristic peak at 2928 $cm^{-1}$ implies the stretching C—H bond, whose intensity is considerably decreased in the A-NMP spectrum compared to the NMP spectrum. This is a result of the reduction in carbon content in A-NMP, which is expected from the elemental analysis results shown in FIG. 2.

Figures 3, 4:
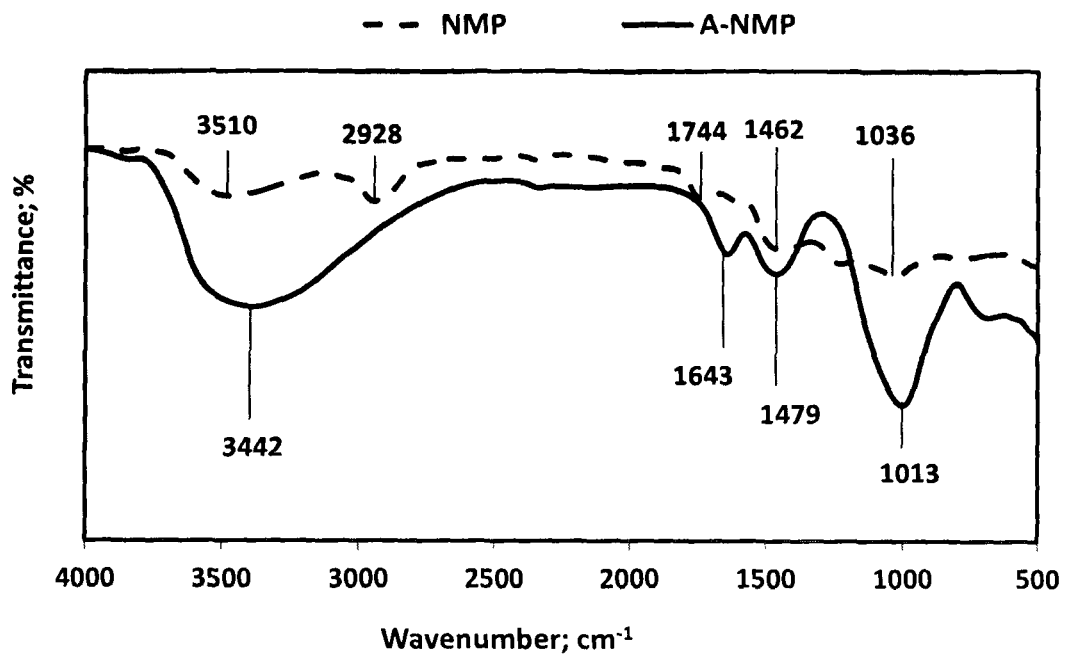
FIG. 3 shows elemental compositions of materials in accordance with one or more embodiments disclosed herein.
FIG. 4 shows Fourier Transform Infrared (FTIR) spectra of materials in accordance with one or more embodiments disclosed herein.

Referring to FIG. 4, the strong absorption band peaked at around 3443 $cm^{-1}$ in the A-NMP spectrum can be assigned to the O—H stretching moiety. On account of the depolymerization of the network in the course of activation, more Si—O—Si and Si—O—Al bonds are broken down into hydroxyl-containing silanol groups and hence the intensity of the peak is increased after activation. Further, the bands at 1013 $cm^{-1}$ and 1036 $cm^{-1}$ in the NMP and A-NMP spectra are ascribed to the siloxane entity. It is expected that the activation process results in an increase of porosity causing the availability of more surface siloxanic functional groups and thus the absorption of more light at its corresponding wavelength, which accounts for the stronger absorption band in the case of A-NMP.

Figure 5:
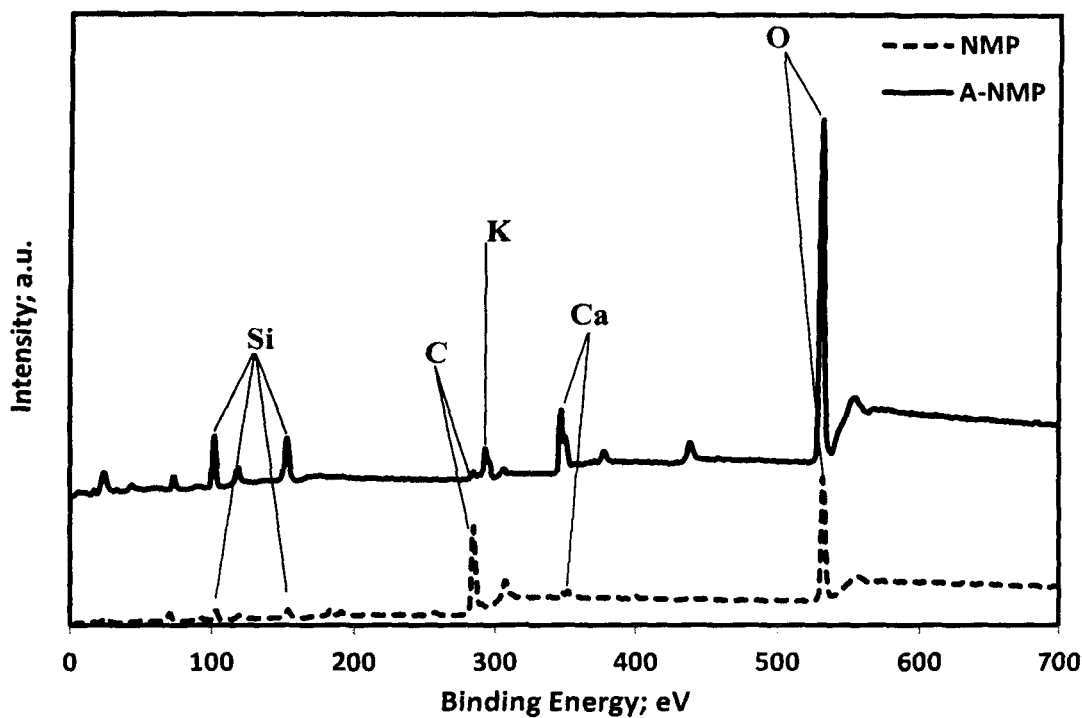
FIG. 5 shows X-ray photoelectron spectroscopy (XPS) spectra of materials in accordance with one or more embodiments disclosed herein.

The surface chemistry of NMP and A-NMP materials have been studied by X-ray photoelectron spectroscopy (XPS). A wide scan spectrum of NMP and A-NMP is shown in FIG. 5. The most predominant photoelectron peaks are found at 102 eV, 153 eV, 285 eV, 293 eV, 347 eV, and 531 eV, which are attributed to Si (2p), Si (2s), C (1s), K (2p), Ca (2p), and O (1s). As illustrated in FIG. 5, the intensities of oxygen, silicon, calcium, and potassium peaks have increased on the surface of A-NMP, whereas a smaller carbon peak has been detected on the surface of A-NMP compared to NMP. This observation is consistent with the previous observation of reduced carbon content of A-NMP from elemental analysis. Further, an increase in the intensity of surface oxygen of A-NMP signifies that oxygen atoms in the silicate network come into the surface either as Si—OH or Si—O—X groups where X can be either Si or Al. It should be noted that there are already many Si—O—X groups on the surface of NMP. Nonetheless, when NMP reacts with KOH, its surface area increases due to the cleavage of the siloxane functional groups resulting in the exposure of more oxygen atoms as either reacted silanol or unreacted siloxane groups in the network. The same reasoning applies for the increase of the surface calcium, silicon, and potassium elements of A-NMP.

Figure 6A:
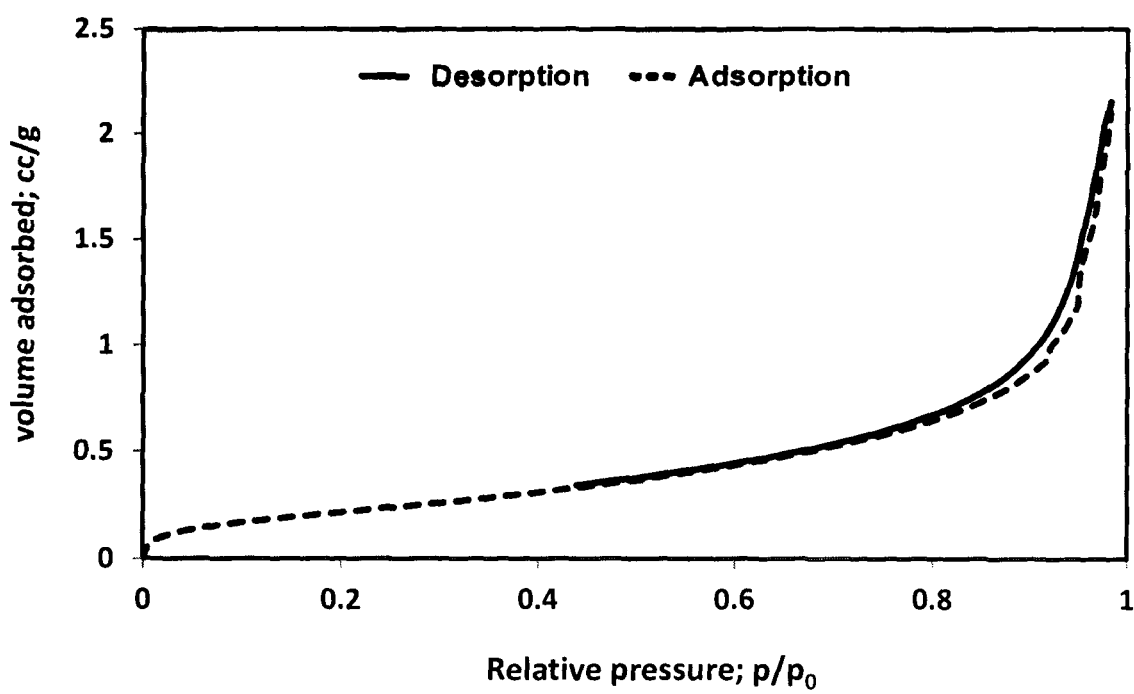
FIG. 6a shows $N_2$ adsorption-desorption isotherms in accordance with one or more embodiments disclosed herein.
Figure 6B:
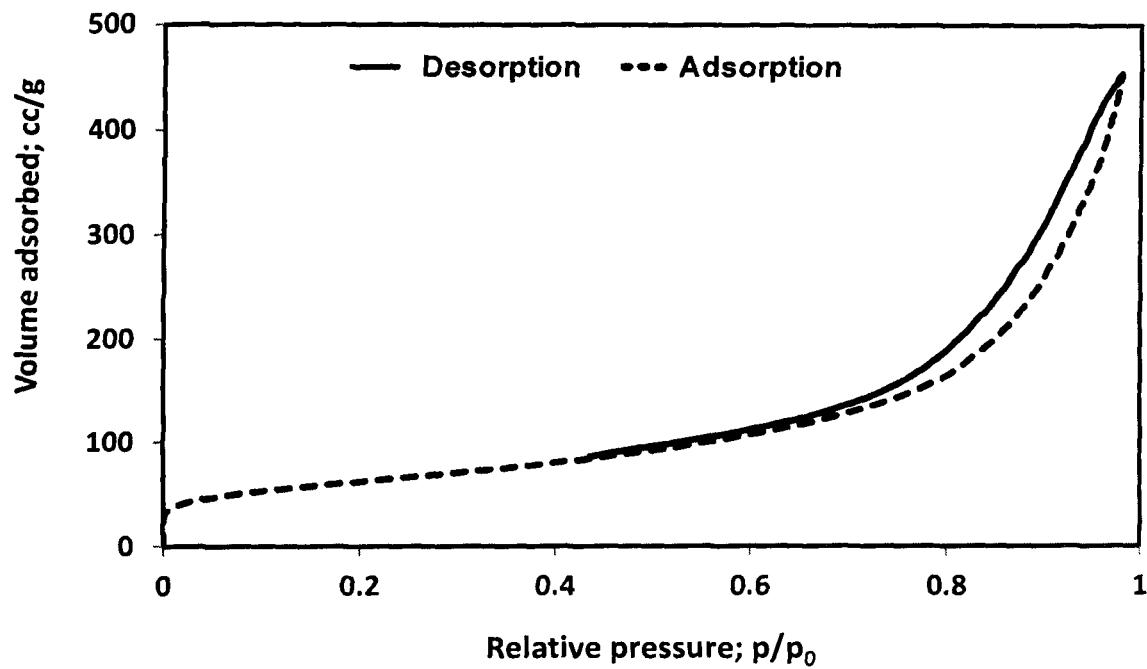
FIG. 6b shows $N_2$ adsorption-desorption isotherms in accordance with one or more embodiments disclosed herein.
Figure 7:
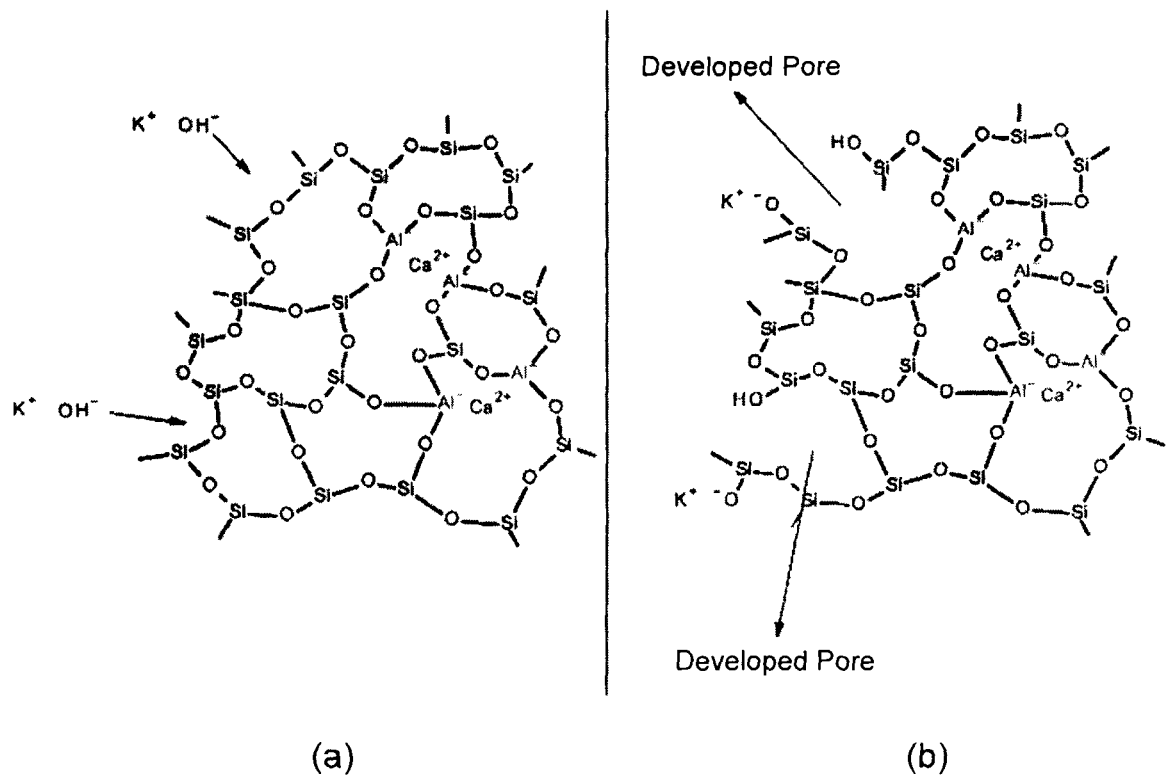
FIG. 7a illustrates a schematic mechanism in accordance with one or more embodiments disclosed herein.
FIG. 7b illustrates a schematic mechanism in accordance with one or more embodiments disclosed herein.

The increased porosity of the A-NMP is one of the properties in determining its ability to adsorb the metal ions from a solution. Therefore, the specific surface areas and micropore volumes of NMP and A-NMP have been calculated by applying the Brunauer, Emmett and Teller (BET) equation and t-plot method, respectively. It has been determined from the results that the specific surface area (SBET) of the material increases from 0.9 $m^2/g$ for untreated NMP to 300 $m^2/g$ for impregnated and activated A-NMP. The nitrogen adsorption-desorption isotherm for the untreated NMP is shown in FIG. 6a and is indicative of a "Type III" isotherm, which is the result of the nonporous structure of the untreated NMP with weak adsorbate-adsorbent interactions. In contrast, the corresponding isotherm for the impregnated and activated A-NMP is shown in FIG. 6b and is indicative of a "Type IV" isotherm, with a distinct H3 hysteresis loop according to the International Union of Pure and Applied Chemistry (IUPAC) classification, which is characteristic of mesoporous materials. FIGS. 7a and 7b, illustrate schematic mechanisms for aluminosilicate impregnated with potassium hydroxide before activation and aluminosilicate impregnated with potassium hydroxide after activation, respectively.

An Impregnated and Activated Ion Exchange Material Prepared by a Process

In another aspect, embodiments disclosed herein relate to an impregnated and activated ion exchange material prepared by a process. In one or more embodiments disclosed herein, the process may include the steps of impregnating an ion exchange precursor material and activating the impregnated ion exchange precursor material to increase the porosity of the impregnated ion exchange precursor material. The process may further include nonmetallic part (NMP) of scrap printed circuit boards as ion exchange precursor material. NMP is alternatively referred herein as nonmetallic printed circuit board, untreated NMP or simply "NMP." NMP is characterized as a very hydrophobic material.

The impregnating step of the process may further include reacting the NMP with an impregnator solution, thereby increasing the surface area and the hydrophilicity of the NMP. In one or more embodiments, the impregnator solution may include a caustic solution, for example a solution of potassium hydroxide. In other embodiments disclosed herein, activation of the impregnated NMP may be done by heating. Further, in other embodiments disclosed herein, the ion exchange precursor material may include amorphous aluminosilicate. In yet other embodiments disclosed herein, the ion exchange precursor material may include mixtures of NMP and amorphous aluminosilicate.

It is understood by one of ordinary skill in the art that the impregnated and activated ion exchange precursor material prepared by a process is corresponding to the method for fabricating an ion exchanger described earlier. As such, the same conditions, variations, and materials described during the method for fabricating an ion exchanger may apply as well to the impregnated and activated ion exchange precursor material prepared by a process. Further, it is understood by one of ordinary skill in the art that the above-referenced conditions and materials are exemplary only and therefore not limiting. Other conditions and materials could be used as well for an impregnated and activated ion exchange precursor material prepared by a process, without departing from the scope of this disclosure.

A Method for Removing Heavy Metal Ions from a Solution

In another aspect, embodiments disclosed herein relate to a method for removing heavy metal ions from a solution. In one or more embodiments disclosed herein, the process may include bringing an impregnated and activated ion exchange precursor material in contact with the solution containing heavy metal ions. Such heavy metal ions may include, but are not limited to, for example Cd, Pb, Cu, and Zn, which are subject to environmental regulations by the Hong Kong Government's Environmental Protection Department to protect the quality of surface and ground water from such heavy metal pollutants. Other fluid streams that may be treated for removal of heavy metals or heavy metal containing compounds include, for example, flue gas streams produced from the combustion of hydrocarbon-containing materials such as coal and petroleum fuels. The process may further include nonmetallic part (NMP) of scrap printed circuit boards as ion exchange precursor material. NMP is alternatively referred herein as nonmetallic printed circuit board, untreated NMP or simply "NMP." NMP is characterized as a very hydrophobic material. In contrast, impregnated and activated NMP (A-NMP) has been converted to a hydrophilic material.

The method for removing heavy metal ions from a solution may further include exchanging heavy metal ions from the solution for alkali metal ions in the impregnated and activated NMP (A-NMP), wherein the heavy metal ions from the solution are adsorbed at the A-NMP and the exchanged alkali metal ions are released into the solution. Further, the method for removing heavy metal ions from a solution may include a solution from at least one of municipal waste water, commercial waste water, by-product of an industrial process, naturally contaminated water, accidentally contaminated water, and water contaminated by runoff.

It is understood by one of ordinary skill in the art that the method for removing heavy metal ions from a solution may be utilized for removal of heavy metal ions from not only the above-referenced sources but from any contaminated source. Further, it is understood by one of ordinary skill in the art that bringing A-NMP in contact with a solution containing heavy metal ions can be achieved in many ways. One example is immersion of A-NMP into the solution containing heavy metal ions. Another example is placement of A-NMP in a fixed-bed reactor, through which the solution containing heavy metal ions is passed. However, these examples are exemplary only and therefore not limiting. Other methods for bringing A-NMP in contact with a solution containing heavy metal ions could be used as well, without departing from the scope of this disclosure.

In addition, it is understood that in other embodiments for the method for removing heavy metal ions from a solution disclosed herein, the ion exchange material may include impregnated and activated amorphous aluminosilicate. In yet other embodiments disclosed herein, the ion exchange material may include mixtures of A-NMP and impregnated and activated amorphous aluminosilicate.

While the disclosed embodiments have been described with respect to a limited number of embodiments, those skilled in the art will readily appreciate that many modifications are possible in the example embodiments without materially departing from this invention. Accordingly, all such modifications are intended to be included within the scope of this disclosure as defined in the following claims

What is claimed:

1. A method for fabricating an ion exchanger, the method comprising:
    impregnating a hydrophobic nonmetallic printed (NMP) circuit board ion exchange precursor material, wherein impregnating the ion exchange precursor material comprises:
        reacting the ion exchange precursor material with a caustic impregnator solution to break a portion of bonds in the hydrophobic ion exchange precursor material into hydroxyl moieties, thereby increasing the surface area and the amount of hydroxyl moieties as well as rendering the hydrophobic ion exchange precursor material hydrophilic; and
    activating the impregnated ion exchange precursor material to increase porosity and affect the surface and a plurality of inner layers of the impregnated ion exchange precursor material.

2. The method according to claim 1, wherein the method for fabricating the ion exchanger further comprises washing and drying the impregnated and activated ion exchange precursor material.

3. The method according to claim 1, wherein during the impregnating of the ion exchange precursor material, a first plurality of alkali metal ions present in the caustic impregnator solution is exchanged with hydrogen atoms at the surface of the ion exchange precursor material.

4. The method according to claim 1, wherein during the activating of the impregnated ion exchange precursor material, a residual carbon content of the impregnated ion exchange precursor material is reduced.

5. The method according to claim 1, wherein during the activating of the impregnated ion exchange precursor material, a plurality of bond cleavages are restored in the impregnated ion exchange precursor material.

6. The method according to claim 1, wherein during the activating of the impregnated ion exchange precursor material, a plurality of alkali metal ions are exchanged for hydrogen atoms in the impregnated ion exchange precursor material.

7. The method according to claim 1, wherein a molarity of the caustic impregnator solution is between 0.05 and 5 mol/L.

8. The method according to claim 1, wherein during the impregnating of the ion exchange precursor material the mass ratio of the caustic impregnator solution to ion exchange precursor material is between 0.05 and 10.

9. The method according to claim 1, wherein the duration of impregnating the ion exchange precursor material is between 0.5 and 48 hours.

10. The method according to claim 1, wherein during the impregnating of the ion exchange precursor material, the impregnated ion exchange precursor material is at a temperature between 20 and 90° C.

11. The method according to claim 1, wherein the duration of activating the impregnated ion exchange precursor material is between 0.5 and 24 hours.

12. The method according to claim 1, wherein during the activating of the impregnated ion exchange precursor material, the impregnated ion exchange precursor material is heated to a temperature between 100 and 700° C.

13. The method according to claim 1, wherein the caustic impregnator solution comprises alkali metal ions.

14. The method according to claim 1, wherein the impregnating and activating occur prior to the ion exchange precursor material being used in ion exchange.

* * * * *